(12) United States Patent
Humphries et al.

(10) Patent No.: US 7,741,854 B2
(45) Date of Patent: Jun. 22, 2010

(54) METHOD OF IN SLOT TIGHTNESS MEASURING OF STATOR COIL

(75) Inventors: Benjamin T. Humphries, Orlando, FL (US); Constance M. Smith, Oviedo, FL (US); James F. Lau, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 223 days.

(21) Appl. No.: 12/055,465

(22) Filed: Mar. 26, 2008

(65) Prior Publication Data
US 2009/0243419 A1 Oct. 1, 2009

(51) Int. Cl.
*G01R 31/34* (2006.01)
(52) U.S. Cl. .................. 324/546; 324/527; 324/772
(58) Field of Classification Search .............. 324/546, 324/772, 527
See application file for complete search history.

(56) References Cited

U.S. PATENT DOCUMENTS

| 4,534,206 A | 8/1985 | Kiso et al. |
|---|---|---|
| 4,889,000 A | 12/1989 | Jaafar et al. |
| 5,012,684 A | 5/1991 | Humphries |
| 5,140,231 A * | 8/1992 | Kashiyama .............. 318/116 |
| 5,295,388 A | 3/1994 | Fischer et al. |
| 5,325,008 A | 6/1994 | Grant |
| 6,218,756 B1 | 4/2001 | Gardner et al. |
| 6,294,855 B1 | 9/2001 | Kelleher |
| 6,584,680 B2 | 7/2003 | Iversen et al. |
| 6,631,335 B2 | 10/2003 | Lusted et al. |
| 6,794,884 B2 | 9/2004 | Kliman et al. |
| 7,112,909 B2 | 9/2006 | Swartout et al. |
| 2002/0198669 A1 | 12/2002 | Lusted et al. |

FOREIGN PATENT DOCUMENTS

| JP | 62282257 A | 12/1987 |
|---|---|---|
| WO | 2007009460 A | 1/2007 |

\* cited by examiner

*Primary Examiner*—Vincent Q Nguyen

(57) ABSTRACT

A method for measuring a tangential tightness of a stator coil within an armature slot of a stator assembly in an electric generator. The stator coil is excited to produce a vibratory response therein. The vibratory response of the stator coil is detected and a frequency response function of the vibratory response is determined. A tangential tightness of the stator coil within the armature slot is estimated based on the frequency response function of the vibratory response of the stator coil.

20 Claims, 5 Drawing Sheets

METHOD OF IN SLOT TIGHTNESS MEASURING OF STATOR COIL

FIELD OF THE INVENTION

The present invention generally relates to electric generators, and more particularly, to a method for measuring the tangential tightness of a stator coil within an armature slot of a turbine generator.

BACKGROUND OF THE INVENTION

In large electric generators, a stator assembly includes stator coils which are retained within an armature slot. The stator coils may be held in place by stator wedges, which are typically inserted within a pair of opposed parallel grooves on either side of the armature slot. Top ripple springs can be inserted between the stator wedges and the stator coils to maintain a positive load on the stator coils and to thereby maintain a consistent pressure or preload on the stator coil. In addition, side ripple springs may be inserted along the side of the stator coils in engagement with the armature slot walls to reduce vibration of the stator coils in the tangential direction.

A common problem associated with stator coils is that they can become loose within the armature slots. It has been found that loosening of the stator coils within the armature slots may lead to relative movement between the stator coils and the armature slot and an increase of levels of vibration of the stator coils. These conditions may cause deterioration and failure of stator coil insulation and stator core laminations. Further, it is possible that tangential vibration of the stator coils within the armature slot may cause electrical discharges between the stator coils and the stator core, which may result in spark erosion of those components. These undesirable results may necessitate replacement or time consuming and difficult repair procedures, such as a stator coil rewinding process.

Tests have been developed to estimate the tightness of stator wedges and top ripple springs within the stator assemblies. One such test, disclosed in U.S. Pat. No. 6,631,335, involves exciting a vibration in a stator wedge of a stator assembly, which includes the stator wedge, one or more stator coils, and optionally ripple springs, which is disposed in an armature slot. The vibratory response of the stator assembly is measured and compared to previously saved vibratory responses of stator assemblies to estimate the tightness of the stator assembly within the armature slot.

Another such test, disclosed in U.S. Pat. No. 5,012,684, discloses a wedge block having a hydraulic cylinder, wherein the wedge block is installed within an upper groove of a pair of parallel grooves in an armature slot or a stator slot, The hydraulic cylinder is activated to press down on a load plate, which in turn contacts a slot wedge within the other of the parallel grooves. This in turn compresses a top ripple spring between the slot wedge and the stator windings. A load cell measures the force required to compress the top ripple spring, while four linear variable differential transformers measure the amount of displacement of the slot wedge. These two measurements are then used to derive a measurement for the tightness for the combined structure of the slot wedge and the top ripple spring.

Tests such as these are performed with the stator wedges in place, and may be effective at determining the tightness of stator wedges and top ripple springs within a slot. However these types of tests can be inconclusive with respect to side-to-side or tangential stator coil tightness, and do not provide a measurement specific to vibration of the stator coils themselves within the armature slots. Moreover, as stator coils implemented in current generator designs become increasingly thinner with an associated increase in flexibility in the tangential direction, testing based on a vibratory response of the stator wedge and ripple spring structure installed in the slot may become less precise when estimating component tightness within the slots.

Current methods of determining a relative tangential tightness of stator coils within stator slots include the use of "feeler gauges" that are probed into the space between the stator coil and a wall that defines the armature slot. The feeler gauge provides the tester with a feel for the approximate width of the space. Since no direct reading of the tangential tightness of the stator coil within the armature slot is measured, the precision of the readings supplied by the feeler gauges is low.

SUMMARY OF THE INVENTION

In accordance with a first aspect of the present invention, a method for measuring a tangential tightness of a stator coil within an armature slot of a stator assembly in an electric generator comprises exciting the stator coil to create a vibratory response of the stator coil, detecting the vibratory response of the stator coil, determining a frequency response function of the vibratory response of the stator coil, and estimating a tangential tightness of the stator coil within the armature slot based on the frequency response function of the vibratory response of the stator coil.

In accordance with a second aspect of the present invention, a method for measuring a vibratory response of a stator coil to estimate a tangential tightness of the stator coil within an armature slot of a stator assembly in an electric generator comprises removing at least one of a stator wedge, a top slot filler, and a top ripple spring from the armature slot, exciting the stator coil by directly impacting a radially inner side of the stator coil with an exciter having a load cell to create a vibratory response of the stator coil, the vibratory response comprising one of a tangential vibratory response and a radial vibratory response, detecting the vibratory response of the stator coil, determining a frequency response function of the vibratory response of the stator coil, and estimating a tangential tightness of the stator coil within the armature slot based on the frequency response function of the vibratory response of the stator coil.

In accordance with a third aspect of the present invention, a method for reducing spark erosion of a stator coil in an armature slot of an electric generator comprises exciting the stator coil to create a vibratory response of the stator coil, detecting the vibratory response of the stator coil, determining a frequency response function of the vibratory response of the stator coil, estimating a tangential tightness of the stator coil within the armature slot based on the frequency response function of the vibratory response of the stator coil, and inserting at least one filler member between the stator coil and a wall defining the armature slot if the estimated tangential tightness of the stator coil within the armature slot is not within a predetermined range.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
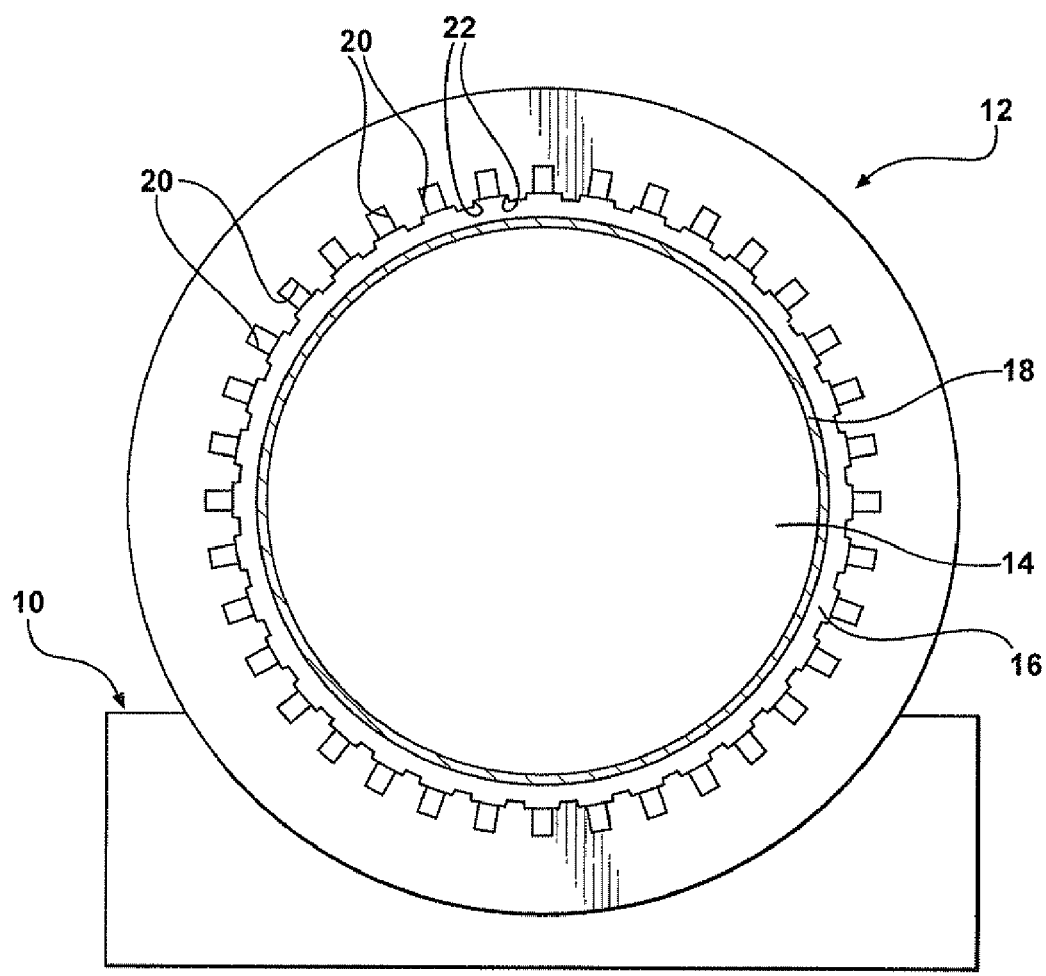
FIG. 1 is a diagrammatic cross sectional view of an electric generator having a rotor installed within a stator assembly.

Referring now to the drawings, FIG. 1 shows a cross sectional view of a known electric generator 10, such as a turbine powered generator, including a stator assembly 12 surrounding a rotor 14. A narrow radial gap 16 (somewhat exaggerated in the figure) exists between the stator assembly 12 and a retaining ring 18 disposed about the rotor 14. The stator assembly 12 includes an annular array of axially extending armature slots 20. Each armature slot 20 may be formed in the stator assembly 12 with a stator tooth 22 formed on either side thereof.

Figure 2:
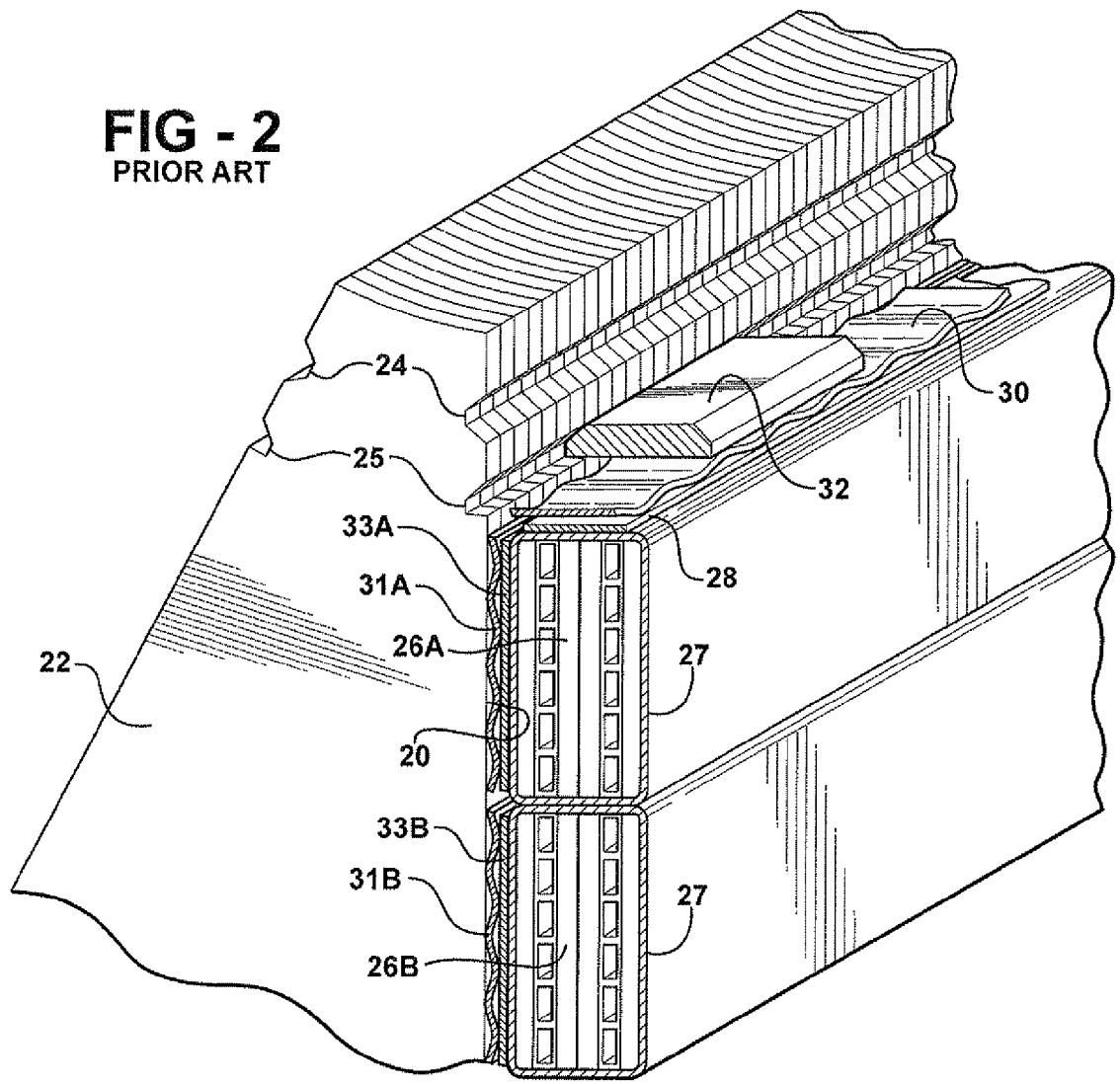
FIG. 2 is a partial isometric view of a portion of the electric generator illustrated in FIG. 1.
Figure 3:
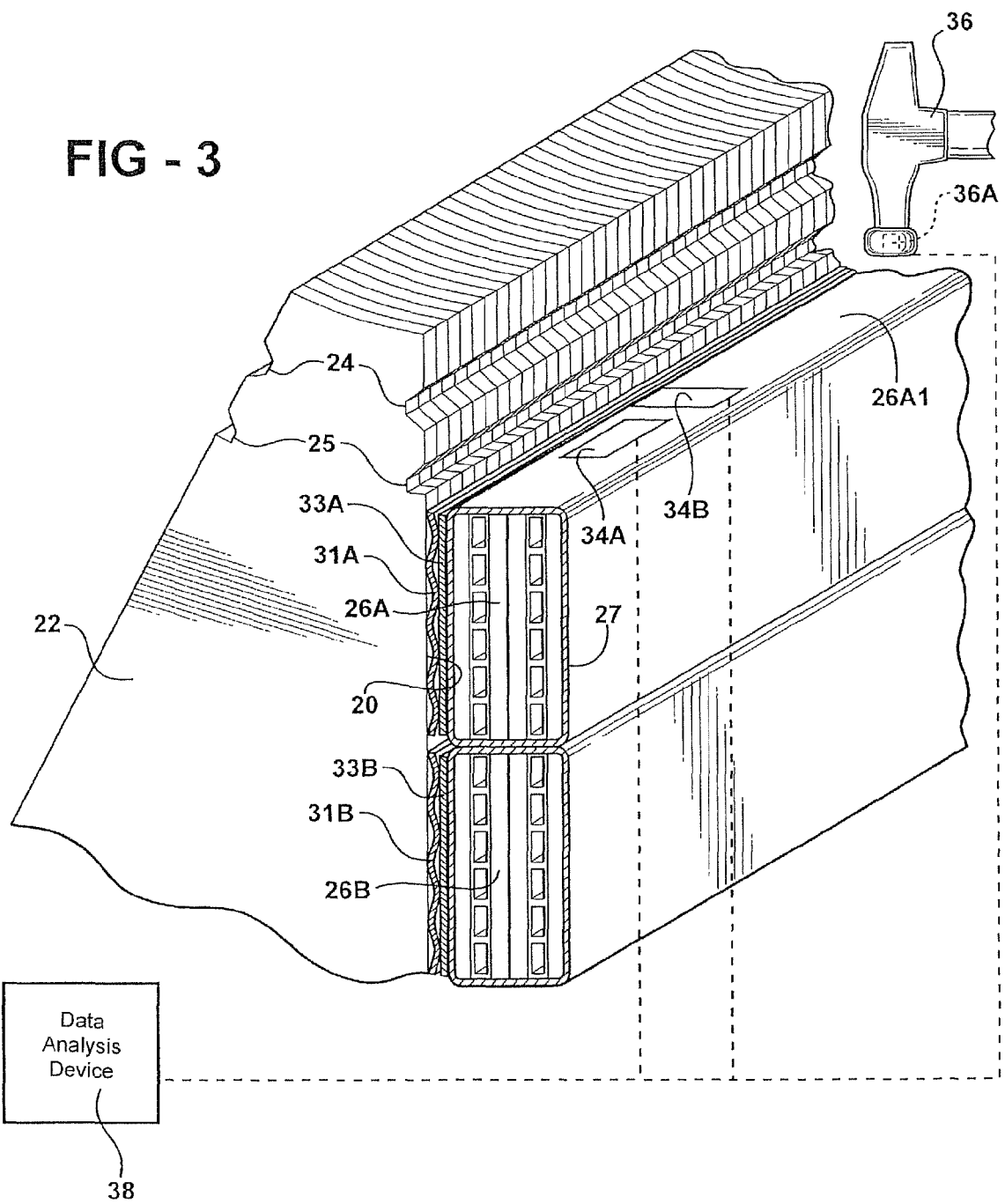
FIG. 3 is a partial isometric view of a portion of the electric generator illustrated in FIG. 1, wherein components of the electric generator are partially installed in a stator slot for testing in accordance with an embodiment of the invention.

As shown in FIGS. 2 and 3, each stator tooth 22 (one shown in FIGS. 2 and 3) includes a pair of axially extending grooves 24, 25 which are radially disposed with respect to each other. Thus, each armature slot 20 includes two pairs of generally parallel grooves 24, 25 formed therein. Stator coils 26A, 26B, which may be wrapped or partially wrapped in an insulation layer 27, are disposed in each of the armature slots 20 of the stator assembly 12. In a typical stator assembly 12, a pair of stator coils 26A, 26B is stacked within the armature slot 20, one radially disposed on top of the other, as shown in FIGS. 2 and 3. One or more filler members, such as top slot fillers 28 or shims are typically placed radially inwardly from the top stator coil 26A. Additional filler members, such as a top ripple spring 30 may be disposed within the armature slot 20 radially inwardly from the top slot fillers 28.

In the embodiment shown, a filler member such as a first side ripple spring 31A is disposed in the armature slot 20 perpendicular to the top ripple spring 30 between the top stator coil 26A and the stator tooth 22, and another filler member such as a second side ripple spring 31B is disposed in the armature slot 20 perpendicular to the top ripple spring 30 between the bottom stator coil 26B and the stator tooth 22. Optionally, one or more additional filler members, such as first and second side slot fillers 33A, 33B or shims may be placed between the side ripple springs 31A, 31B and the respective stator coil 26A, 26B. Alternatively, the side slot fillers 33A, 33B may be placed in the armature slot 20 between the stator tooth 22 and the stator coils 26A, 26B without the side ripple springs 31A, 31B. The side ripple springs 31A, 31B and side slot fillers 33A, 33B are designed to fill any axial gap that is created between the stator coils 26A, 26B and the stator tooth 22 and to increase tightness therebetween in the tangential direction.

Finally one or more stator wedges 32 are installed within the armature slot 20 radially inwardly from the top ripple spring 30. The stator wedges 32 are installed by sliding the stator wedges 32 into at least one of corresponding parallel grooves 24, 25. The stator wedges 32 compress the top ripple spring 30 against the top slot fillers 28, which is in turn compressed against the top stator coil 26A to tightly secure the stator coils 26A, 26B radially within the armature slot 20.

A method of measuring a tangential tightness of a selected stator coil 26A, 26B within the armature slot 20 will now be described. The stator wedges 32 are removed from the armature slot 20 to expose the top ripple spring 30. Any method of removing the stator wedges 32 may be used, such as by impacting the stator wedges 32 with a striking force to slide the stator wedges 32 out of the corresponding parallel grooves 24, 25, for example. The top ripple spring 30 and the top slot fillers 28 are then removed from the armature slot 20 to expose the top stator coil 26A, as illustrated in FIG. 3. It is noted that if it is desirous to measure the tightness of the bottom stator coil 26B, the top stator coil 26A can be removed.

It should be understood that, although the description of the present embodiment refers to removal of structure including the stator wedges 32, top ripple springs 30, and top slot fillers 28 from engagement with the top stator coil 26A, the invention may be practiced with new installations of the stator coils 26A, 26B prior to installation of the wedges 32, top ripple springs 30, and top slot fillers 28. Hence, the invention is generally applicable to a stator structure having a stator coil 26A exposed within the stator slot 20.

As seen in FIG. 3, the selected stator coil 26A is exposed (the top stator coil 26A has been selected in this embodiment), and a first vibration sensor 34A, such as, for example, an accelerometer, a laser vibrometer, or an Eddy current probe, is attached to a radially inner side 26A1 of the selected stator coil 26A, such as, for example, with a duct seal putty or a PCB accelerometer attachment wax, which is commercially available from PCB Piezotronics, Inc. of Depew, N.Y. . Optionally, a second vibration sensor 34B, such as, for example, an accelerometer, a laser vibrometer, or an Eddy current probe, is attached to the radially inner side 26A1 of the selected stator coil 26A, such as, for example, with a duct seal putty or a PCB accelerometer attachment wax. In this embodiment, the first vibration sensor 34A is attached to the inner side 26A1 of the selected stator coil 26A in a direction wherein the tangential vibration of the selected stator coil 26A is measurable, and the second vibration sensor 34B is attached to the inner side 26A1 of the selected stator coil 26A in a direction wherein the radial vibration of the selected stator coil 26A is measurable. As used herein, tangential vibration is vibration in the circumferential direction and radial vibration is vibration in the radial direction.

The selected stator coil 26A is then excited using an exciter 36 having a load cell comprising an exciter sensor 36A, as shown in FIG. 3 to measure the force applied to the selected stator coil 26A. Any method of exciting the selected stator coil 26A may be used, and in the preferred embodiment, excitation of the selected stator coil 26A is effected by means of a direct impact on the radially inner side 26A1 of the selected stator coil 26A with a hammer, for example. Other types of exciters may be used and may excite the selected stator coil 26A in any direction. The excitation of the selected stator coil 26A creates a tangential vibratory response of the exposed stator coil 26A. The tangential vibratory response is detected using the first vibration sensor 34A. The excitation of the selected stator coil 26A also creates a radial vibratory response of the exposed stator coil 26A. The radial vibratory response is detected using the second vibration sensor 34B. The exciter sensor 36A detects the exciting force exerted by the exciter 36 on the selected stator coil 26A. It is understood that these processes may be repeated several times along the length of the selected stator coil 26A, wherein the vibration sensors 34A, 34B are repositioned and the exciter 36 is used to excite the selected stator coil 26A in a different location, so that a plurality of vibratory responses are detected.

The vibratory responses of the selected stator coil 26A and the exciting force of the exciter 36 are transmitted to a data analysis device 38, which is in communication with the vibration sensors 34A, 34B and the exciter sensor 36A. In the embodiment shown, the data analysis device 38 is a spectrum analyzer, although other suitable data analyzers could be used. The data analysis device 38 converts the vibratory responses of the selected stator coil 26A and the exciting force of the exciter 36, i.e., analog signals from the vibration sensors 36A, 36B and the exciter sensor 36A, into digital signals. The digital signals are then used to determine and plot frequency response functions of the tangential vibratory response and the radial vibratory response of the selected stator coil 26A. In this embodiment, the frequency response functions are plotted as a ratio of acceleration in the tangential or radial direction (g) to input force (IbF) versus frequency (Hz). These processes can be accomplished by a number of methods including, for example, Fourier Analysis, Fast Fourier Transform, or Order Tracking Analysis. It should be noted that while both the tangential and radial vibratory responses are detected and plotted according to this embodiment, only one of the tangential and radial vibratory responses need be detected and plotted to provide sufficient information to analyze the tangential tightness of the selected stator coil 26A. Since the exciting force exerted by the exciter 36 is detected and included in the determination of the frequency response function of the tangential vibratory response of the selected stator coil 26A, the exciting force exerted by the exciter 36 need not be constant for each determination.

Once the frequency response function of the vibratory responses of the selected stator coil 26A is plotted, the local mode of the frequency response function is determined, such as by locating the zero crossing on the corresponding frequency plot. It should be understood that other methods of determining the local mode of the vibratory response of the frequency response function of the selected stator coil 26A may be used without departing from the spirit and scope of the invention.

In one embodiment, data is initially collected for a variety of stator coils which are disposed in stator assemblies at various known coil tangential tightnesses. This data may be used to develop frequency-to-tightness correlation databases for stator coils in that particular stator assembly. For example, a particular stator assembly including a stator coil 26A having a known tangential tightness may be excited to create tangential and radial vibratory responses of the stator coil 26A. The vibratory responses of the stator coil 26A can be detected by the vibration sensors 34A, 34B and the data analysis device 38 may convert the vibratory responses of the stator coil 26A into reference frequency response functions of the corresponding vibratory response of the stator coil 26A. The local mode of the reference frequency response function of the corresponding vibratory response may then be determined. The local mode of the reference frequency response function of the corresponding vibratory response of the stator coil 26A, which corresponds to the known tangential tightness of the stator coil 26A, may then be saved in the corresponding frequency-to-tightness correlation database. This process may be repeated a plurality of times for different known stator coil tangential tightnesses to complete the correlation databases. The saved local modes contained in the correlation databases can be used for estimating the tangential tightnesses of other stator coils having an unknown tangential tightness.

Figure 4:
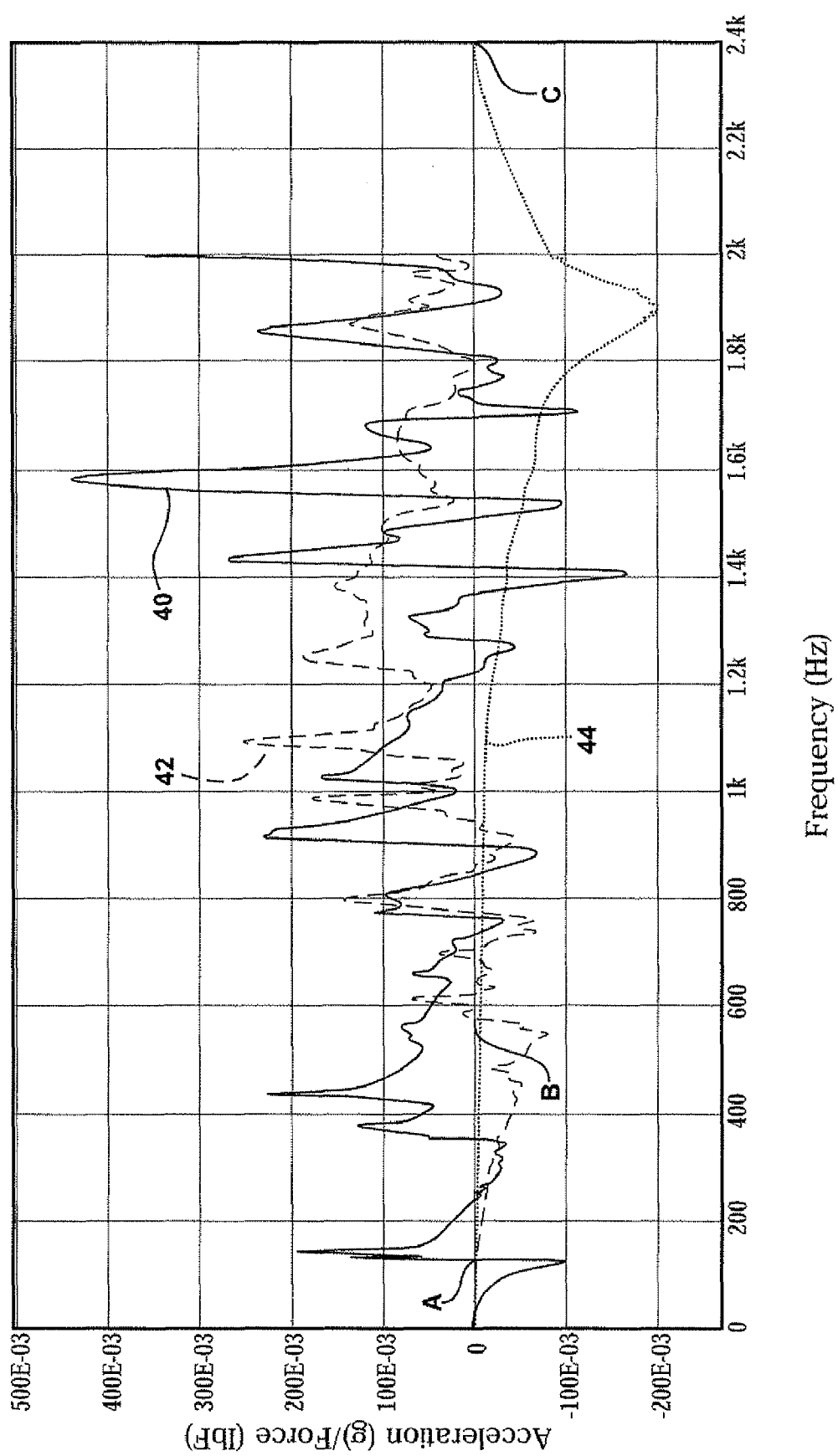
FIG. 4 is a graph illustrating radial vibration test data corresponding to three, different stator coil tightness conditions generated in accordance with the invention.

In accordance with this embodiment, FIG. 4 shows a graph of radial vibration test data that has been obtained for a plurality of stator coils having different tangential tightnesses, and in which the frequency response function for the radial vibration is plotted as a function of the frequency. The solid line 40 depicts the frequency response function of a coil having a loose tangential tightness, the dashed line 42 depicts the frequency response function of a coil having a mid range tangential tightness, and the dotted line 44 depicts the frequency response function of a coil having a tight tangential tightness. The loose level of stator coil tightness 40 S corresponds to a stator coil 26A in a stator assembly wherein the side ripple spring 31A and the side slot filler 33A were removed. The mid-range level of stator coil tightness 42 corresponds to a stator coil in a stator assembly wherein the side slot filler 33A was in place without the side ripple spring 31A. The high level of stator coil tightness 44 corresponds to a stator coil in a stator assembly wherein the side ripple spring 31A was in place without the side slot filler 33A.

As shown in FIG. 4, the frequency response function for the loose level of stator coil tangential tightness 40 has an output comprising a local mode (first zero crossing of frequency plot) of around 125 Hz, identified by point A, the frequency response function for the mid-range level of stator coil tangential tightness 42 has an output comprising a local mode of around 575 Hz, identified by point B, and the frequency response function for the high level of stator coil tangential tightness 44 has an output comprising a local mode of around 2400 Hz, identified by point C. It is known that side slot fillers 33A, 33B provide increased stator coil tangential tightness, and that side ripple springs 31A, 31B provide even more stator coil tangential tightness. The exemplary results shown in FIG. 4 illustrate that stator coil tangential tightness is directly related to the local mode of the frequency response function of the radial vibratory response of the stator coil, and that the local mode increases as a function of the tangential tightness of the stator coil. In other words, a substantially accurate measurement of the tangential tightness of a stator coil within an armature slot may be obtained by taking a local vibratory response measurement directly on the stator coil, where higher stator coil local modes of the frequency response functions of radial vibratory responses indicate higher levels of stator coil tangential tightness within armature slots 20.

Figure 5:
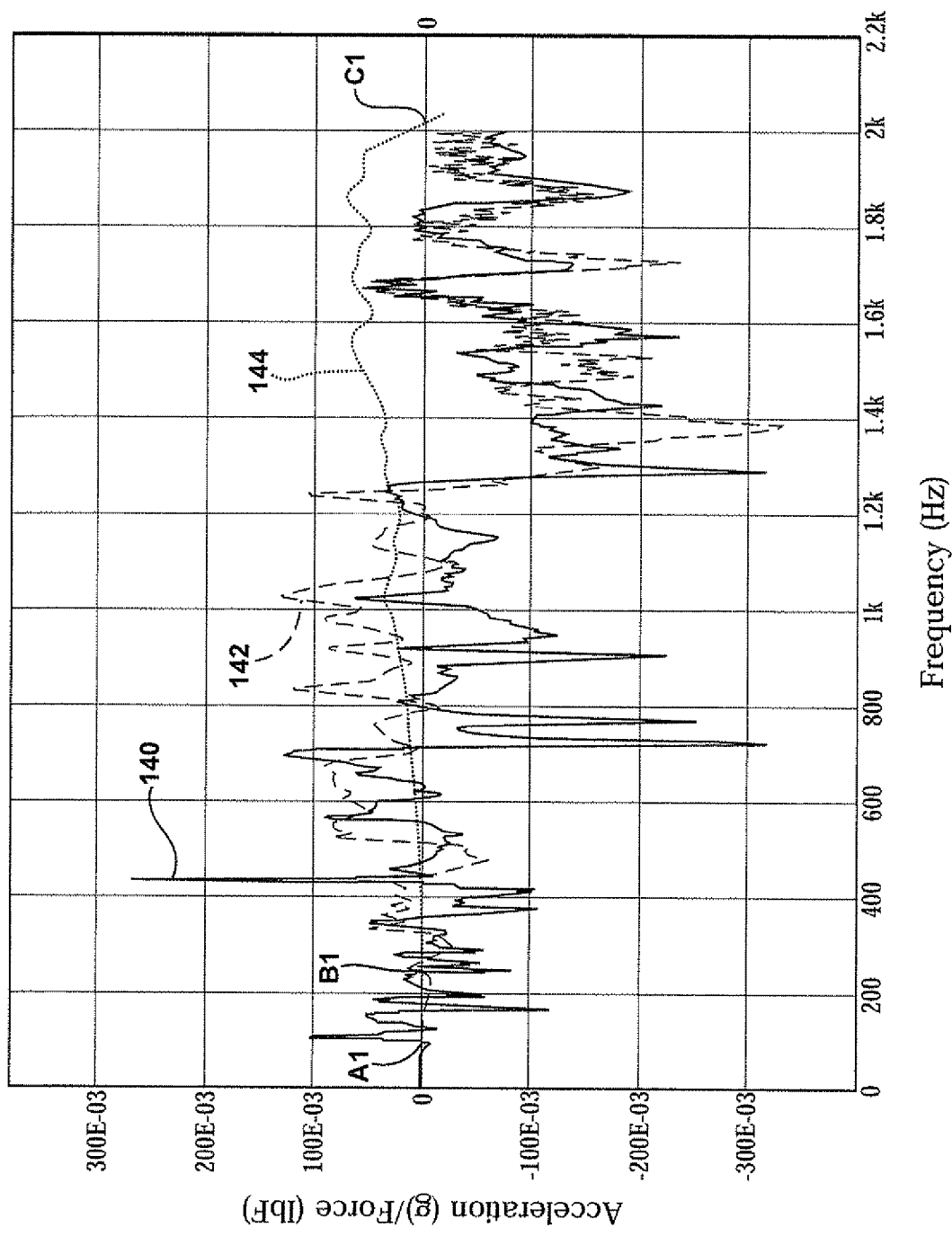
FIG. 5 is a graph illustrating tangential vibration test data corresponding to three different stator coil tightness conditions generated in accordance with the invention.

FIG. 5 shows a graph of tangential vibration test data that has been obtained for a plurality of stator coils having different tangential tightnesses, and in which the frequency response function for the tangential vibration is plotted as a function of frequency. The solid line 140 depicts the frequency response function of a coil having a loose tangential tightness, the dashed line 142 depicts the frequency response function of a coil having a mid range tangential tightness; and the dotted line 144 depicts the frequency response function of a coil having a tight tangential tightness. Conditions of stator assemblies to which these measurements correspond were substantially similar to those described above with respect to FIG. 4.

The outputs comprising local modes corresponding to the lines 140, 142, 144, designated by points A1 (around 100 Hz), B1 (around 240 Hz), and C1 (around 2020 Hz), respectively, further illustrate that stator coil tangential tightness is directly related to the local mode of the frequency response function of the tangential vibratory response of the stator coil. As noted with regard to the plot of FIG. 4, for the radial vibration frequency response function, the tangential tightness of the stator coil within the armature slot may be substantially accurately determined by obtaining a direct vibratory measurement for the stator coil, and, in particular for the exemplary embodiment of FIG. 5, may be obtained by obtaining a direct measurement of tangential vibration of the stator coil.

In a preferred embodiment, the local mode of the frequency response function of the radial vibratory response of the selected stator coil 26A provides a substantially accurate determination of the tangential tightness of the stator coil 26A. However, the local mode of the frequency response function of the tangential vibratory response of the selected stator coil 26A may also be used to determine the tangential tightness of the stator coil 26A.

It should be understood that the frequency response functions of the vibratory responses of the selected stator coil 26A and that of the stator coils recorded in a selected previously saved corresponding frequency-to-tightness correlation database could be directly compared to estimate the tangential tightness of the selected stator coil 26A without locating the local modes of the frequency response functions. In this case, the frequency response function the of the selected stator coil 26A could be directly compared to one or more reference frequency response functions in a corresponding previously saved frequency-to-tightness correlation database. The reference frequency response function in the corresponding previously saved frequency-to-tightness correlation database that most nearly matches the frequency response function of the selected stator coil 26A would have a similar tangential tightness to that of the selected stator coil 26A.

The present invention offers a direct measurement of the tangential tightness of a stator coil 26A, 26B within an armature slot 20 of a stator assembly 12, wherein the tangential tightness is based on a vibratory response of the stator coil 26A, 26B. Since the measurements are performed directly on a selected one of the stator coils 26A, 26B without pressure from the stator wedges 32, top ripple springs 30, and top slot fillers 28, local modes of the selected stator coils 26A, 26B are measured as if the selected stator coil 26A, 26B is on an elastic foundation. That is, the vibratory response of the structure comprising the stator coils 26A, 26B, side slot fillers 33A, 338, and/or side ripple springs 31A, 31B may be determined without damping or other effects that may be present with the stator wedges 32, top ripple springs 30, and/or top slot fillers 28.

Once the tangential tightness of the stator coil 26A, 26B is estimated, the stator assembly 12 may be modified as needed For example, if the stator coil 26A, 26B is not tight enough, additional side slot fillers 33A, 33B and/or side ripple springs 31A, 31B can be added to the stator assembly 12 as desired to increase the tangential tightness of the stator coil 26A, 26B within the armature slot 20. As the tightness of the stator coil 26A, 26B within the armature slot 20 is increased, relative movement between the stator coil 26A, 26B and the armature slot 20 is decreased, for effecting a reduction in deterioration and failure of the stator coil insulation layer 27. In particular, tangential vibration levels of the stator coil 26A, 26B within the armature slot 20 are reduced, effecting a decrease in electrical discharges between the stator coils 26A, 26B and the stator core, thus reducing spark erosion. Accordingly, damage to the stator assembly 12 resulting from tangential movement of the stator coils 26A, 26B may be decreased, reducing the need for stator assembly 12 replacement and repair procedures.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for measuring a tangential tightness of a stator coil within an armature slot of a stator assembly in an electric generator comprising:
   exciting said stator coil to create a vibratory response of said stator coil;
   detecting said vibratory response of said stator coil;
   determining a frequency response function of said vibratory response of said stator coil; and
   estimating a tangential tightness of said stator coil within said armature slot based on said frequency response function of said vibratory response of said stator coil.

2. The method of claim 1, wherein estimating a tangential tightness of said stator coil within said armature slot comprises comparing said frequency response function of said vibratory response of said stator coil to data in a frequency-to-tightness correlation database.

3. The method of claim 2, wherein said data in said frequency-to-tightness correlation database corresponds to particular reference frequency response functions of previously measured stator coils within stator assemblies having known stator coil tangential tightnesses.

4. The method of claim 3, wherein estimating a tangential tightness of said stator coil within said armature slot further comprises determining which of said previously measured stator coils within stator assemblies having known stator coil tangential tightnesses corresponds to an output of a reference frequency response function most nearly matching an output of said frequency response function of said vibratory response of said stator coil.

5. The method of claim 4, wherein said output of said reference frequency response function of said comprises a local mode of said frequency response function, and wherein said output of said frequency response function of said vibratory response of said stator coil comprises a local mode of said frequency response function of said vibratory response of said stator coil.

6. The method of claim 1, wherein exciting said stator coil to create a vibratory response of said stator coil comprises an exciter having a load cell directly impacting a radially inner side of said stator coil to create a vibratory response of said stator coil.

7. The method of claim 1, wherein exciting said stator coil to create a vibratory response of said stator coil comprises exciting said stator coil to create one of a tangential vibratory response and a radial vibratory response of said stator coil.

8. The method of claim 1, wherein detecting said vibratory response of said stator coil comprises temporarily attaching an accelerometer to said stator coil, wherein said accelerometer detects said vibratory response of said stator coil.

9. The method of claim 1, further comprising removing at least one stator wedge from said armature slot prior to exciting said stator coil.

10. The method of claim 9, further comprising removing at least one of a top slot filler and a top ripple spring from said armature slot prior to exciting said stator coil.

11. A method for measuring a vibratory response of a stator coil to estimate a tangential tightness of said stator coil within an armature slot of a stator assembly in an electric generator comprising:

removing at least one of a stator wedge, a top slot filler, and a top ripple spring from said armature slot;

exciting said stator coil by directly impacting a radially inner side of said stator coil with an exciter having a load cell to create a vibratory response of said stator coil, said vibratory response comprising one of a tangential vibratory response and a radial vibratory response;

detecting said vibratory response of said stator coil;

determining a frequency response function of said vibratory response of said stator coil; and estimating a tangential tightness of said stator coil within said armature slot based on said frequency response function of said vibratory response of said stator coil.

12. The method of claim 11, wherein estimating a tangential tightness of said stator coil within said armature slot comprises comparing said frequency response function of said vibratory response of said stator coil to data in a frequency-to-tightness correlation database.

13. The method of claim 12, wherein said data in said frequency-to-tightness correlation database corresponds to particular reference frequency response functions of previously measured stator coils within stator assemblies having known stator coil tangential tightnesses.

14. The method of claim 13, wherein estimating a tangential tightness of said stator coil within said armature slot further comprises determining which of said previously measured stator coils within stator assemblies having known stator coil tangential tightnesses corresponds to an output of a reference frequency response function most nearly matching an output of said frequency response function of said vibratory response of said stator coil.

15. The method of claim 14, wherein said output of said reference frequency response function comprises a local mode of said frequency response function, and wherein said output of said frequency response function of said vibratory response of said stator coil comprises a local mode of said frequency response function of said vibratory response of said stator coil.

16. A method for reducing spark erosion of a stator coil in an armature slot of an electric generator comprising:

exciting said stator coil to create a vibratory response of said stator coil;

detecting said vibratory response of said stator coil;

determining a frequency response function of said vibratory response of said stator coil;

estimating a tangential tightness of said stator coil within said armature slot based on said frequency response function of said vibratory response of said stator coil; and inserting at least one filler member between said stator coil and a wall defining said armature slot if said estimated tangential tightness of said stator coil within said armature slot is not within a predetermined range.

17. The method of claim 16, further comprising removing at least one of a stator wedge, a top slot filler, and a top ripple spring from said armature slot prior to exciting said stator coil.

18. The method of claim 16, wherein estimating a tangential tightness of said stator coil within said armature slot comprises comparing said frequency response function of said vibratory response of said stator coil to data in a frequency-to-tightness correlation database.

19. The method of claim 16, wherein exciting said stator coil to create a vibratory response of said stator coil comprises an exciter having a load cell directly impacting a radially inner side of said stator coil to create one of a tangential vibratory response of said stator coil and a radial vibratory response of said stator coil.

20. The method of claim 16, wherein inserting at least one filler member between said stator coil and a wall defining said armature slot comprises inserting one of a side slot filler and a side ripple spring between said stator coil and said wall defining said armature slot.

\* \* \* \* \*